United States Patent [19]

Hosono et al.

[11] Patent Number: 4,860,638
[45] Date of Patent: Aug. 29, 1989

[54] ACTUATOR DRIVING SYSTEM

[75] Inventors: Masayuki Hosono; Kengi Waragai; Jun Hiramoto, all of Sohka, Japan

[73] Assignee: SMC Corporation, Tokyo, Japan

[21] Appl. No.: 122,121

[22] Filed: Nov. 17, 1987

[30] Foreign Application Priority Data

Nov. 18, 1986 [JP] Japan ............................. 61-274394
Nov. 18, 1986 [JP] Japan ............................. 61-176990

[51] Int. Cl.⁴ .................... F15B 11/00; F15B 13/00
[52] U.S. Cl. ................................. 91/536; 92/61; 92/163; 285/133.1; 137/884
[58] Field of Search .............. 91/536; 92/106, 61, 92/32, 159, 28, 163, 164; 285/133.1, 12; 279/4, 2 A; 408/130; 137/530, 884

[56] References Cited

U.S. PATENT DOCUMENTS

| | | | |
|---|---|---|---|
| 2,838,074 | 6/1968 | Lauck | 285/133.1 |
| 2,932,284 | 4/1960 | Stace et al. | 92/59 |
| 3,106,346 | 10/1963 | Thomas | 285/133.1 |
| 3,678,810 | 7/1972 | Holmes et al. | 285/133.1 |
| 4,139,021 | 2/1979 | Ailshie et al. | 137/596.13 |
| 4,323,269 | 4/1982 | Pellenc | 285/133.1 |

FOREIGN PATENT DOCUMENTS

| | | |
|---|---|---|
| 1806011 | 5/1969 | Fed. Rep. of Germany . |
| 1452104 | 12/1966 | France . |
| 2265028 | 3/1974 | France . |
| 0062738 | 7/1940 | Norway ......................... 92/106 |

OTHER PUBLICATIONS

European Search Report.

*Primary Examiner*—Robert E. Garrett
*Assistant Examiner*—Thomas Denion
*Attorney, Agent, or Firm*—Burns, Doane, Swecker & Mathis

[57] ABSTRACT

An actuator driving system for driving a plurality of actuators operable by a fluid under pressure includes a plurality of tube joints connected respectively to the actuators for being coupled with a plurality of double-walled tubes each having a plurality of passages. Each of the tube joints includes a base member having passages communicating with respective fluid ports of one of the actuators and mounted on said one actuator, and a body member having a first cylindrical body mounted on the base member and a second cylindrical body having a hole for insertion of one of the double-walled tubes therein, to allow the passages of said one double-walled tube to communicate respectively with the passages of the base member, the first cylindrical body being angularly movable with respect to the base member.

7 Claims, 9 Drawing Sheets

ACTUATOR DRIVING SYSTEM

The present invention relates to an actuator driving system, and more particularly to an actuator driving system wherein tube joints for use with double-walled tubes and speed controllers are angularly movably mounted on respective actuators operable under fluid pressure, so that the double-walled tubes for supplying a fluid to said actuators can easily be connected to said actuators in any of various directions.

Figure 1:
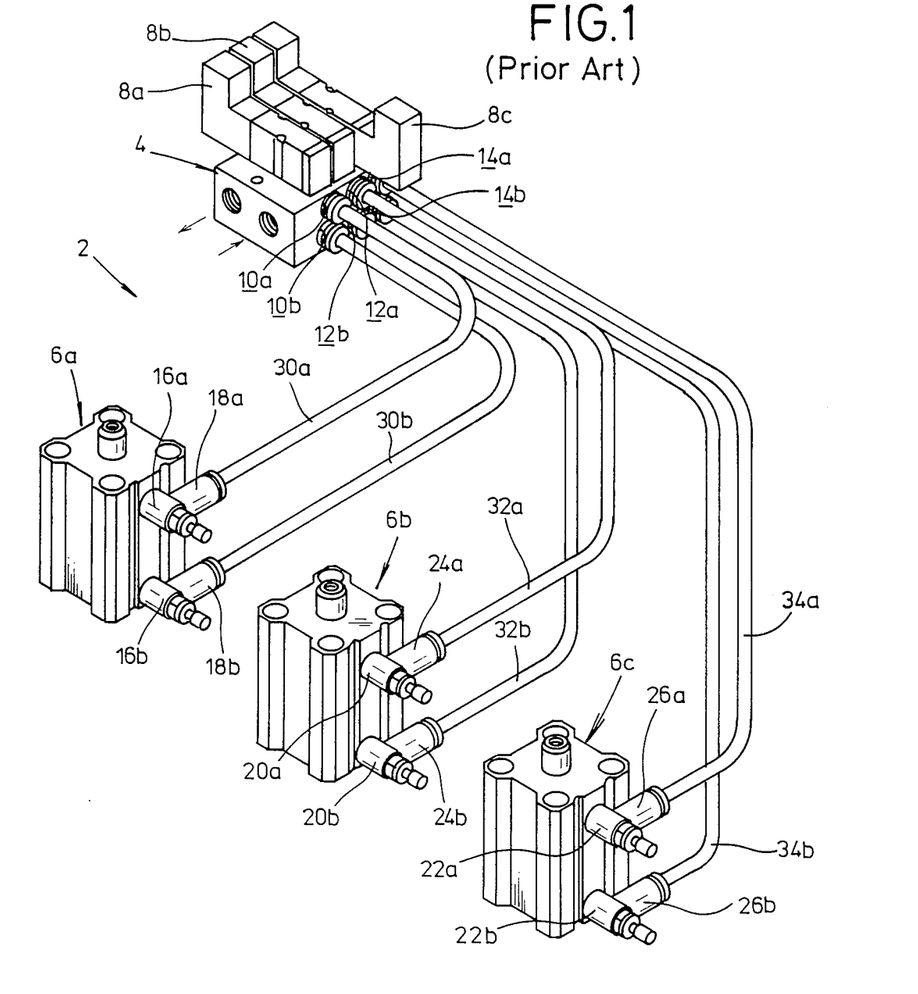
FIG. 1 is a perspective view of a conventional actuator driving system.

Heretofore, there have widely been employed systems in which a plurality of tubes are connected to a single source of a fluid under pressure and directional control valves for driving actuators are coupled to the tubes. Where the actuators are cylinders, the cylinders normally have first ports for introducing a fluid to drive them in one direction and second ports for introducing a fluid to drive them in the opposite direction. Therefore, the cylinders are connected to tubes communicating with the first ports and tubes communicating with the second ports. One conventional design of such a system is illustrated in FIG. 1 of the accompanying drawings.

The conventional cylinder driving system, denoted by the reference numeral 2, includes a manifold 4 connected to a source of a fluid under pressure (not shown) through tubes and a plurality of actuators to be driven, such as air cylinders 6a, 6b, 6c. The manifold 4 supports thereon solenoid-operated valves 8a, 8b, 8c associated respectively with the air cylinders 6a, 6b, 6c. The manifold 4 has ports 10a, 10b defined in one side in communication with the solenoid-operated valve 8a, and also has ports 12a, 12b and 14a, 14b defined in the same side in communication with the solenoid-operated valves 8b, 8c, respectively.

To one side of the air cylinder 6a, there are attached a speed controller 16a engaging in one port of the air cylinder 6a and another speed controller 16b engaging in the other port of the air cylinder 6a. The speed controllers 16a, 16b have integral tube joints 18a, 18b, respectively. Likewise, speed controllers 20a, 20b and 22a, 22b are mounted on the air cylinders 6b, 6c, respectively, and have integral tube joints 24a, 24b and 26a, 26b, respectively. The ports 10a, 10b, 12a, 12b, 14a, 18b, 24a, 24b, 26a, 26b which communicate with the air cylinders 6a, 6b, 6c by means of respective tubes 30a, 30b, 32a, 32b, 34a, 34b.

Air supplied from the fluid source (not shown) coupled to the manifold 4 is selectively supplied via the solenoid-operated valves 8a, 8b, 8c to the air cylinders 6a, 6b, 6c. The rate of supply of air may be preset by the speed controllers 16a, 16b, 20a, 20b, 22a, 22b so that the air cylinders 6a, 6b, 6c will operate at desired speeds.

The speed controllers 16a, 16b including the tube joints 18a, 18b are separately coupled to the two ports of the air cylinder 6a. Therefore, the tubes 30a, 30b for supplying air from the manifold 4 to the air cylinder 6a are separate from each other. As a result, the number of tubes required for supplying air to the air cylinders 6a, 6b, 6c in the system 2 is quite large, and the required tubes take up a large space.

The system 2 is thus complex in structure, and the procedure for attaching the tubes is complicated. The system 2 is also unable to be placed in a given small space, which cannot effectively be utilized. With the number of steps required of attaching the tubes being increased, the tendency for the worker to interconnect the wrong ports is increased. If the port 10a is to be connected to the tube joint 18b and the port 10b is to be connected to the tube joint 18a according to a design change, the tubes 30a, 30b should be arranged to cross each other, or may have to be replaced with other tubes. This process is quite tedious and time-consuming.

SUMMARY OF THE INVENTION

It is a general object of the present invention to provide an actuator driving system wherein tube joints for use with double-walled tubes and speed controllers are angularly movably mounted on respective actuators operable under fluid pressure, and body members of the tube joints for being connected to the double-walled tubes which supply a fluid to ports of the actuators are angularly movable, so that the double-walled tubes can easily be connected, the number of the tubes is reduced to permit the tubes to be connected without error by a simple process having a reduced number of assembling steps, and the actuator driving system can accommodate various design changes.

It is a major object of the present invention to provide an actuator driving system for driving a plurality of actuators operable by a fluid under pressure, comprising a plurality of tube joints connected respectively to the actuators for being coupled with a plurality of double-walled tubes each having a plurality of passages, the tube joints being selectively positionable with respect to the actuators, respectively, for allowing the double-walled tubes to be connected to ports of the actuators in desired positions.

Another object of the present invention is to provide an actuator driving system for driving a plurality of actuators operable by a fluid under pressure, comprising a plurality of tube joints connected respectively to the actuators for being coupled with a plurality of double-walled tubes each having a plurality of passages, each of the tube joints including a base member having passages communicating with respective fluid ports of one of the actuators and mounted on said one actuator, and a body member having a first cylindrical body mounted on the base member and a second cylindrical body having a hole for insertion of one of the double-walled tubes therein, to allow the passages of said one double-walled tube to communicate respectively with the passages of the base member, the first cylindrical body being angularly movable with respect to the base member.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 2:
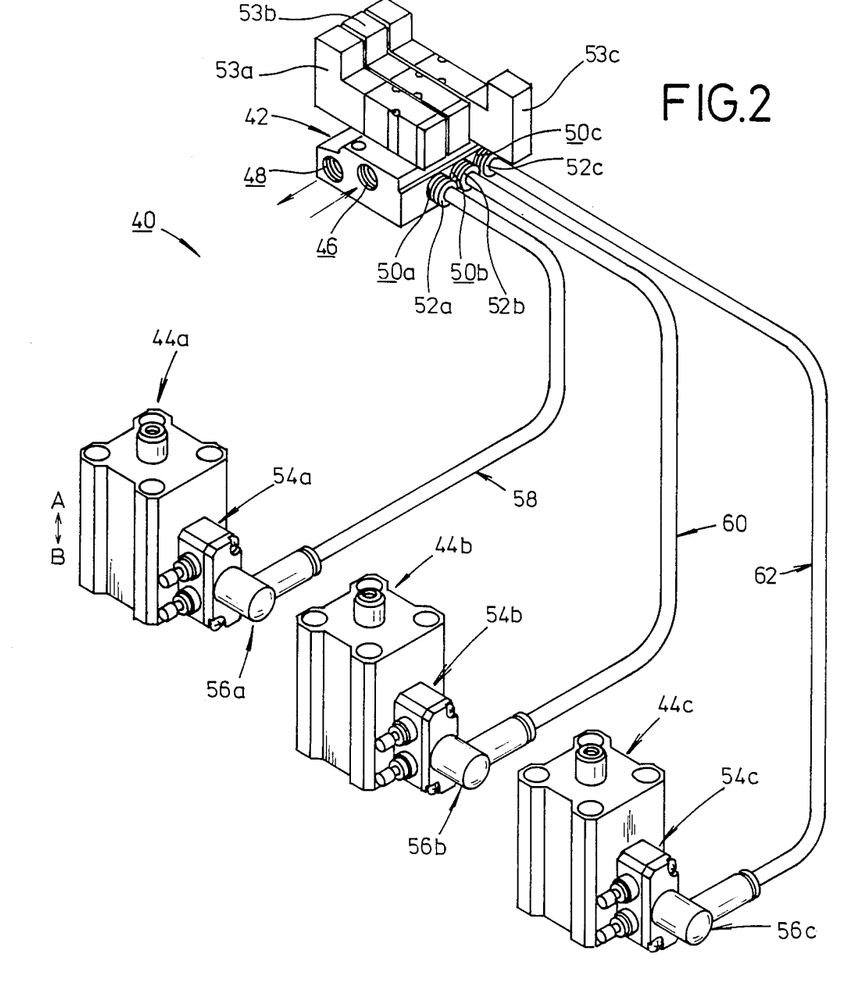
FIG. 2 is a perspective view of an actuator driving system according to an embodiment of the present invention.

As shown in FIG. 2, an actuator driving system 40 according to the present invention includes a solenoid-operated-valve manifold 42 and a plurality of air cylinders 44a, 44b, 44c.

The manifold 42 has defined in one side thereof an inlet port 46 communicating with a source of a fluid under pressure (not shown) and an outlet port 48. The manifold 42 also has defined in another side thereof a first port 50a, a second port 50b, and a third port 50c in which connectors 52a through 52c for double-walled tubes engage. Solenoid-operated valves 53a, 53b, 53c are mounted on an upper surface of the manifold 42. These solenoid-operated valves 53a, 53b, 53c are selectively actuated and inactivated to select passages for a fluid flowing into the connectors 52a through 52c.

On the air cylinders 44a, 44b, 44c, there are mounted respective speed controllers 54a, 44b, 54c for controlling the speed of operation of the air cylinders 44a, 44b, 44c. Tube joints 56a, 56b, 56c for use with double-walled tubes are attached respectively to the speed controllers 54a, 54b, 54c. The tube joint 56a is held in communication with the first port 50a through a double-walled tube 58. Similarly, the tube joints 56b, 56c are held in communication with the second and third ports 50b, 50c respectively through double-walled tubes 60, 62.

Figure 3:
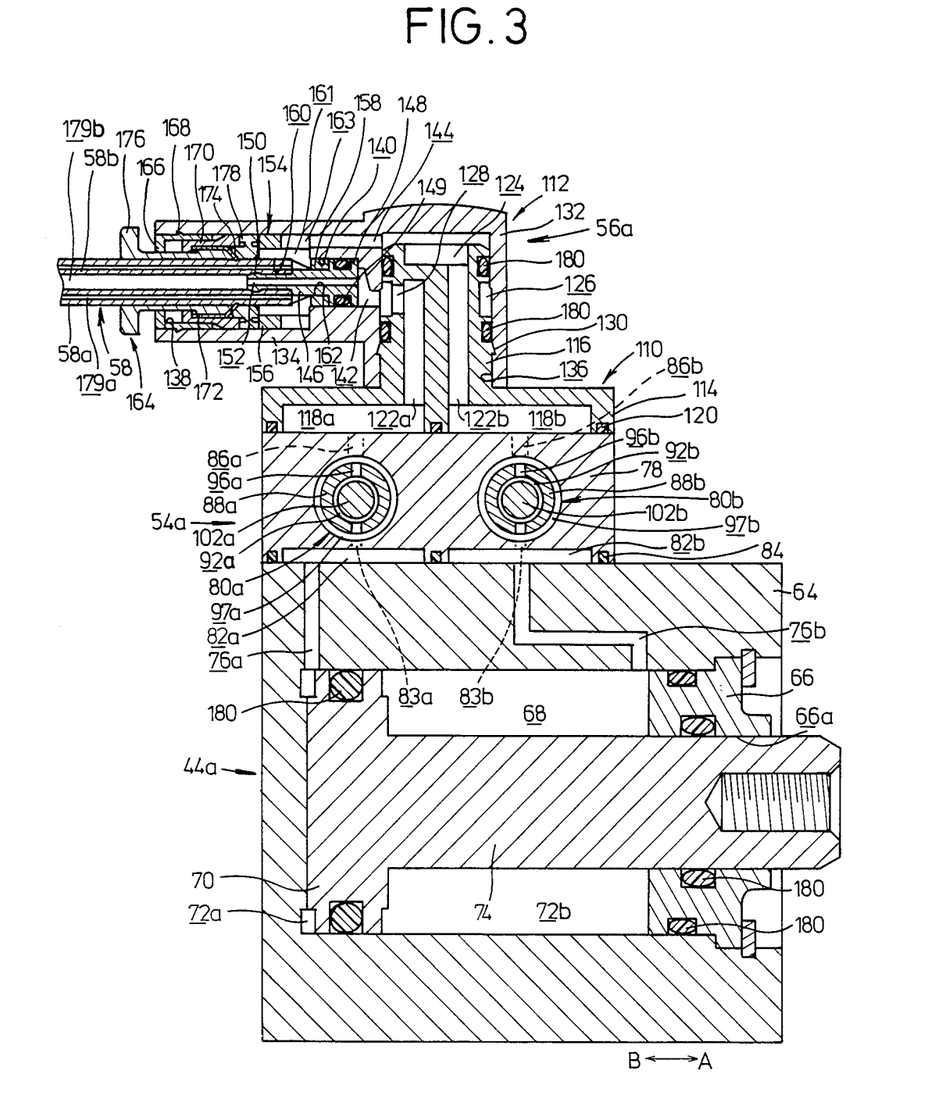
FIG. 3 is an enlarged cross-sectional view of a portion of the actuator driving system of the present invention.

As shown in FIG. 3, the air cylinder 44a includes a cylinder body or casing 64 with a guide member 66 fitted in one end thereof and defining a chamber 68 in the cylinder body 64. The guide member 66 has a hole 66a defined substantially centrally therethrough. A piston 70 is slidably fitted in the chamber 68 and divides the chamber 68 into smaller chambers 72a, 72b. A piston rod 74 extends from one end of the piston 70 into the smaller chamber 72b and has a distal end projecting through the hole 66a of the guide member 66 out of one end of the cylinder body 64.

The cylinder body 64 has defined in one side thereof a straight passage 76a and a bent passage 76b. The passage 76a communicates with the smaller chamber 72a, and the passage 76b communicates with the smaller chamber 72b near the guide member 66.

The speed controller 54a is fixed to one side of the cylinder body 64. The speed controller 54a comprises a body 78, a first control assembly 80a disposed in the body 78, and a second control assembly 80b disposed in the body 78. The body 78 has a recess 82a defined in a lower portion thereof and communicating with the passage 76a of the air cylinder 44a and another recess 82b defined in the lower portion of the body 78 and communicating with the passage 76b. The recesses 82a, 82b communicate with the first and second control assemblies 80a, 80b, respectively, through holes 83a, 83b (see FIGS. 3 and 4).

A gasket 84 is fitted in the surface of the body 68 which mates with the cylinder body 64 of the air cylinder 44a. The upper portion of the body 78 has holes 86a, 86b defined therein in communication with the first and second control assemblies 80a, 80b, respectively.

The first and second control assemblies 80a, 80b are substantially identical in construction. Therefore, only the first control assembly 80a will be described below. Those parts of the second control assembly 80b which are identical to those of the first control assembly 80a are denoted by identical reference numerals with a siffix b, and will not be described in detail.

Figure 4:
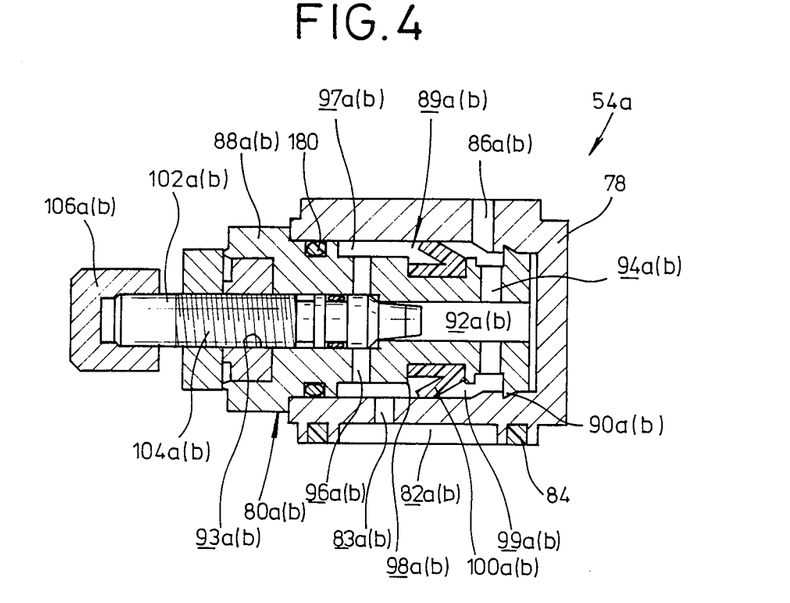
FIG. 4 is a cross-sectional view of a speed controller in the actuator driving system of the present invention.

As illustrated in FIG. 4, the first control assembly 80a includes a fitting member 88a fitted in the body 78 and retained therein by a peripheral ridge 90a on one end of the fitting member 88a. The fitting member 88a and the body 78 jointly define a chamber 89a therebetween. The fitting member 88a has a hole 92a extending axially and including larger- and smaller-diameter portions, and an internally threaded groove 93a communicating with the end of the larger-diameter portion of the hole 92a. The fitting member 88a also has a plurality of passages 94a defined radially therein near the inner end of the fitting member 88a and communicating with the smaller-diameter portion of the hole 92a. The fitting member 88a also has a plurality of radial passages 96a defined substantially centrally therein and communicating with the larger-diameter portion of the hole 92a. A peripheral groove 98a is defined in the outer peripheral surface of the fitting member 88a axially between the passages 94a, 96a. The chamber 89a is divided into smaller chambers 97a, 99a by means of a packing member 100a of a substantially V-shaped cross section which engages in the peripheral groove 98a. The packing member 100a has an outer peripheral edge held against the inner peripheral wall surface of the body 78. The outside diameter of the packing member 100a can be increased and reduced by a fluid pressure supplied from the smaller chamber 99a.

A valve body 102a is fitted in the larger-diameter portion of the hole 92a. The valve body 102a has an externally threaded intermediate portion 104a threadedly engaging in the threaded groove 93a communicating with the larger-diameter portion of the hole 92a. The valve body 102a has an inner end portion slidingly held against the inner surface of the larger-diameter portion of the hole 92a and having a tapered end projecting into the smaller-diameter portion of the hole 92a. The other end of the valve body 102a projects out from the fitting member 88a, and a knob 106a is fitted over the projecting end of the valve body 102a. By turning the knob 106a, the valve body 102a is also turned and axially moved to enable the tapered end thereof to adjust the opening or gap between the tapered end and the inner surface of the smaller-diameter portion of the hole 92a for thereby controlling the rate of flow of a fluid from the recess 82a into the hole 86a.

The speed controller 54a on the cylinder body 64 of the air cylinder 44a may be 180° reversed. If reversed, the recess 82a of the speed controller 54a communicates with the passage 76b defined in the cylinder body 64 and the recess 82b communicates with the passage 76a.

Figure 5:
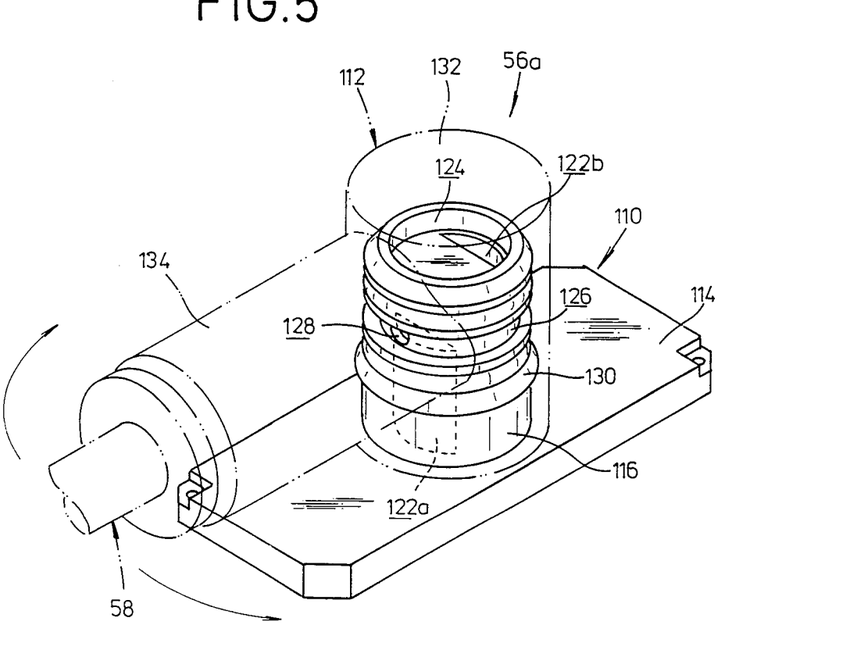
FIG. 5 is a perspective view of a tube joint for use with a double-walled tube in the actuator driving system of the present invention.

The tube joint 56a for use with a double-walled tube is fixed to the upper surface of the speed controller 54a. As shown in FIGS. 3 and 5, the tube joint 56a basically includes a base member 110 fixed to the speed controller 54a and a body member 112 rotatably engaging the base member 110. The base member 110 comprises a rectangular attachment 114 mounted on the speed controller 54a and a column member 116 projecting upwardly from the center of the attachment 114. The attachment 114 has first and second openings 118a, 118b defined in its lower surface, and a gasket 120 engages in the lower surface of the attachment 114 in surrounding relation to the openings 118a, 118b. The column member 116 has first and second axial passages 122a, 122b defined therein and having ends communicating with the first and second openings 118a, 118b, respectively, each of the first and second passages 122a, 122b having a substantially semicircular cross section. The other end of the second passage 122b communicates with a cavity 124 defined in an upper portion of the column member 116. The other end of the first passage 122a communicates through a passage 128 with a peripheral groove 126 defined in the outer peripheral surface of the column member 116. The outer peripheral surface of the column member 116 has an annular locking ridge 130 positioned axially between the peripheral groove 126 and the attachment 114.

The body member 112 is substantially in the form of a cylinder with its upper end closed, and comprises a first cylindrical body 132 fitted over the column member 116 of the base member 110 and a second cylindrical body 134 integral with and extending perpendicularly from the first cylindrical body 132. The column member 116 is fitted in a hole 136 defined in the first cylindrical body 132 and having a length slightly larger than the length of the column member 116.

The second cylindrical body 134 has a first lager-diameter hole 138 extending axially and a second smaller-diameter hole 140 communicating coaxially with the inner end of the first hole 138. The second hole 140 communicates with the peripheral groove 126 of the column member 116 through a passage 142. The first hole 138 communicates with an upper portion of the hole 136 in the first cylindrical body 132 through a smaller-diameter passage 144 defined substantially parallel to the second hole 140.

A seal member 146 is disposed in the second cylindrical body 134. The seal member 146 has a flange 148 on one end thereof which is fitted in the second hole 140. An O-ring 149 is fitted in the flange 148 to hermetically isolate the first hole 138 from the passage 142. An annular engaging portion 150 is formed on the other end of the seal member 146. The seal member 146 has an axial hole 152 defined substantially centrally therethrough.

A holder 154 is mounted in the second cylindrical body 134. The holder 154 has a larger-diameter portion 156 fitted in the first hole 138 and a smaller-diameter portion 158 fitted in the second hole 140. The holder 154 has a first hole 160 defined substantially centrally in the larger-diameter portion 156 and a second hole 162 defined substantially centrally in the smaller-diameter portion 158. The first and second holes 160, 162 communicate with each other through a step and a tapered portion. The first hole 160 is defined by an inner peripheral surface which is recessed to a certain axial length to define a plurality of passages 161 that communicate with the passage 144 in the second cylindrical body 134 through a peripheral groove 163 defined in the inner end of the larger-diameter portion 156.

The second cylindrical body 134 houses therein a double-walled tube connector mechanism 164. The double-walled tube connector mechanism 164 includes a guide member 166 fitted in the first hole 138 of the second cylindrical body 134, the guide member 166 being retained in the second cylindrical body 134 by means of an annular ride 168 on the outer periphery of the guide member 166. A collet 170 has one end fitted in the guide member 166, and a chuck 172 is fitted in the collet 170. The chuck 172 has one end tapered as a biting edge 174 engaging a release bushing 176. When the biting edge 174 is pushed by the release bushing 176, the biting edge 174 is released from a locking condition. A packing member 178 is interposed between the collet 170 and the holder 154 of the double-walled tube connector mechanism 164.

The double-walled tube 58 is connected to the tube joint 56a. The double-walled tube 58 comprises an outer tube 58a and an inner tube 58b. For connecting the double-walled tube 58, it is inserted into the release bushing 176. The outer tube 58a is fitted in the first hole 160 of the holder 154, and the end of the outer tube 58a is held against the step of the first hole 160 to position the outer tube 58a. The distal end of the seal member 146 is fitted in the inner tube 58b to cause the annular engaging portion 150 to hermetically engage the inner periphery of the inner tube 58b. At this time, the biting edge 174 bites into the outer peripheral surface of the outer tube 58a for thereby positioning the double-walled tube 58 fixedly in place. An outer passage 179a defined between the outer and inner tubes 58b, 58a communicates with the second opening 118b through the passages 161, the peripheral groove 163, the passages 144 and 122b. An inner passage 179b defined in the inner tube 58b communicates with the first opening 118a through the hole 152, the passages 142 and 122a.

O-rings 180 serve to prevent air leakage between the members on which the O-rings 180 are mounted. The tube joint 56a on the second controller 54a may be about 180° reversed. If reversed, the first opening 118a communicates with the second control assembly 80b, and the second opening 118b communicates with the first control assembly 80a.

The air cylinder 44a, the speed controller 54a, and the tube joint 56a are constructed as described above. The air cylinders 44b, 44c, the speed controllers 54b, 54c, and the tube joints 56b, 56c are substantially identical in structure to the air cylinder 44a, the speed controller 54a, and the tube joint 56a, respectively, and hence will not be described in detail.

Operation and advantages of the actuator driving system according to the present invention will be described below. Inasmuch as the air cylinders 44a through 44c operate in the same manner, only operation of the air cylinder 44a will be described by way of example, and operation of the other air cylinders 44b, 44c will not be described.

First, the piston rod 74 of the air cylinder 44a is to be displaced in the direction of the arrow A (FIG. 3). Air under pressure is supplied from the fluid source (not shown) into the inlet port 46 of the manifold 42. The solenoid-operated valve 53a is actuated to select the passage which will deliver supplied air into the inner tube 58b of the double-walled tube 58. The air is now fed through the inner passage 179b in the inner tube 58b to the tube joint 56a. From the tube joint 56a, the air goes via the hole 152 in the seal member 146, the passage 142, the peripheral groove 126, and the passage 128 into the first passage 122a in the column member 116. The first passage 122a communicates with the first opening 118a which in turn communicates with the first control assembly 80a through the hole 86a in the body 78 of the speed controller 54a. Therefore, the air from the first passage 122a is introduced into the first control assembly 80a via the first hole 118a and the hole 86a (see FIG. 3). The air which has been introduced from the hole 86a into the first control assembly 80a is then fed from the smaller chamber 99a via the passages 94a into the hole 92a, from which the air flows via the small gap between the wall surface of the hole 92a and the tapered end of the valve body 102, the passages 96a, the smaller chamber 97a, and the hole 83a into the recess 82a. At the same time, the air that has introduced from the hole 86a into the smaller chamber 99a exerts pressure to reduce the outside diameter of the packing member 100a, which then permits the air to pass from the smaller chamber 99a across the packing member 100a into the smaller chamber 97a from which the air flows via the hole 83a into the recess 82a. As shown in FIG. 3, the recess 82a communicates with the passage 76a defined in the cylinder body 64 of the air cylinder 44a. Therefore, the air in the recess 82a is introduced through the passage 76a into the smaller chamber 72a in the air cylinder 44a. The piston 70 and the piston rod 74a of the air cylinder 44a are thus displaced in the direction of the arrow A in FIG. 3.

Air in the smaller chamber 72b is forced to pass through the passage 76b into the recess 82b in the body 78 of the speed controller 54a. The air then flows from the recess 82b through the hole 83b into the smaller chamber 97b. Since one end of the smaller chamber 97b is closed off by the packing member 100, the air in the smaller chamber 97b goes from the passages 96b into the hole 92b. As the opening of the hole 92b is adjusted by the valve body 102b, the rate of flow of air from the passage 96b into the hole 92b is controlled. Thus, the speed at which the piston 70 and the piston rod 74 of the air cylinder 44a are displaced in the direction of the arrow A is adjusted. The air in the hole 92b is delivered via the passages 94b and the hole 86b into the second opening 118b of the tube joint 56a. The air then flows from the second opening 118b via the second passage 122b and the recess 124 into the passage 144, from which the air passes through the peripheral groove 163, the passages 161, and the outer passage 179a of the double-walled tube 58 into the manifold 42. The air is then discharged out of the manifold 42 from the outlet port 48 by the solenoid-operated valve 53a. The air cylinder 44a is driven in the above manner to displace the piston 70 and the piston rod 74 in the direction of the arrow A.

Now, a process for displacing the piston 70 and the piston rod 74 in the direction of the arrow B will be described below.

Air is supplied from the fluid source to the inlet port 46 of the manifold 42. The solenoid-operated valve 53a is actuated to select the passage which will direct the air into the outer passage 179a of the double-walled tube 58. The air flows from the outer passage 179a via the passages 161 of the tube joint 56a, the peripheral groove 163, the passage 144, the passage 122b, and the second opening 118b into the hole 86b of the speed controller 54a. The air then passes through the second control assembly 80b of the speed controller 54a into the passage 76b in the cylinder body 64 of the air cylinder 44a. The air finally reaches the smaller chamber 72b communicating with the passage 76b.

The piston 70 and the piston rod 74 of the air cylinder 44a are thus displaced in the direction of the arrow B.

Air in the smaller chamber 72a is discharged via the passage 76a into the first control assembly 80a of the speed controller 54a, which controls the air flow at a desired flow rate. The air flows from the first passage 122a of the tube joint 56a into the inner passage 179b of the tube coupling 58, from which the air is discharged into the outlet port 48 of the manifold 42.

With the above embodiment, the manifold 42 coupled to the fluid source and the air cylinders 44a through 44c are interconnected by the double-walled tubes 58, 60, 52 in order to supply air for driving the air cylinders 44a through 44c. The speed controllers 54a through 54c and the tube joints 56a through 56c are fixedly mounted on the air cylinders 44a through 44c, the speed controllers 54a through 54c and the tube joints 56a through 56c being about 180° reversible with respect to the air cylinders 44a through 44c. Therefore, the number of tubes for supplying air to drive the air cylinders 44a through 44c is greatly reduced, and the doubled-walled tubes can easily be connected. Since the speed controllers 54a through 54c and the tube joints 56a through 56c are about 180° reversible with respect to the air cylinders 44a through 44c, they can accommodate various design changes.

The body member 112 is angularly movable in a desired direction with the base member 110 being fixed to the speed controller 54a as shown in FIG. 5. The first passage 122a in the base member 110 communicates with the peripheral groove 126 on the outer periphery of the column member 116 through the passage 128. Therefore, even when the body member 112 is turned around the column member 116, the inner passage 179b of the double-walled tube 58 is always held in communication with the first passage 122a through the passage 142 communicating with the peripheral groove 126. Accordingly, no matter how the body member 112 may be angularly moved, the outer passage 179a of the double-walled tube 58 and the second passage 122b are kept in mutual communication through the passage 144.

As a consequence, the body member 112 can freely be angularly moved with respect to the base member 110 as desired. Where the cylinder 44a and another pneumatic device are juxtaposed, by positioning the second cylindrical body 134 remotely from the other pneumatic device, the double-walled tube 58 is prevented from engaging or otherwise involved with the tubes connected to the other pneumatic device. Therefore, the cylinder 44a and the other pneumatic device can be placed as closely to each other as possible. By suitably positioning the second cylindrical body 134, various different pneumatic devices can be placed effectively in a small space.

A second embodiment of the present invention will hereinafter be described. Those parts of the second embodiment which are identical to those of the first embodiment are denoted by identical reference numerals and will not be described in detail.

Figure 6:
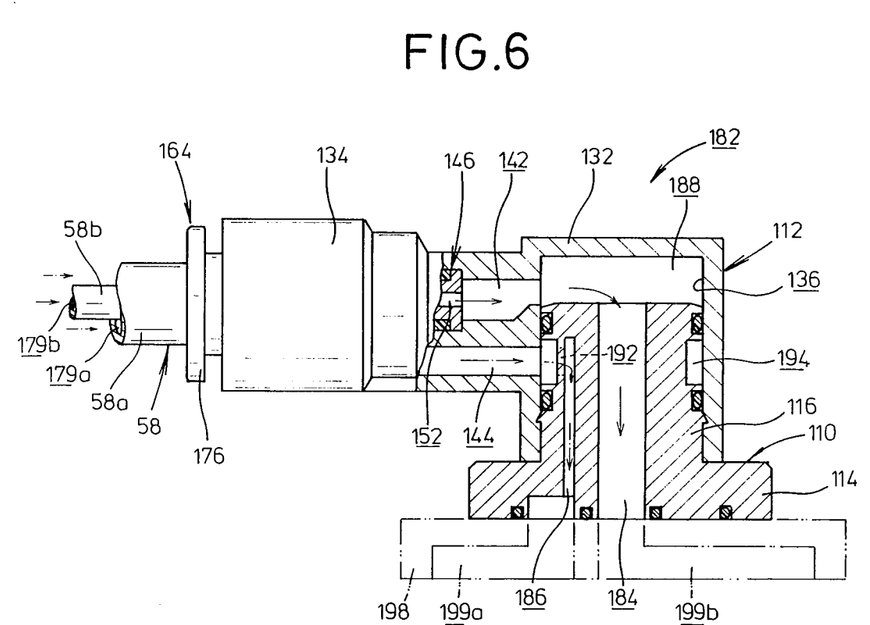
FIG. 6 is a cross-sectional view of a tube joint for use with a double-walled tube in an actuator driving system according to another embodiment of the present invention.

In the second embodiment, each of the tube joints 56a through 56c according to the first embodiment which are connected to the air cylinders 44a through 44c by the speed controllers 54a through 54c, respectively, is replaced with a tube joint 182.

Figure 7:
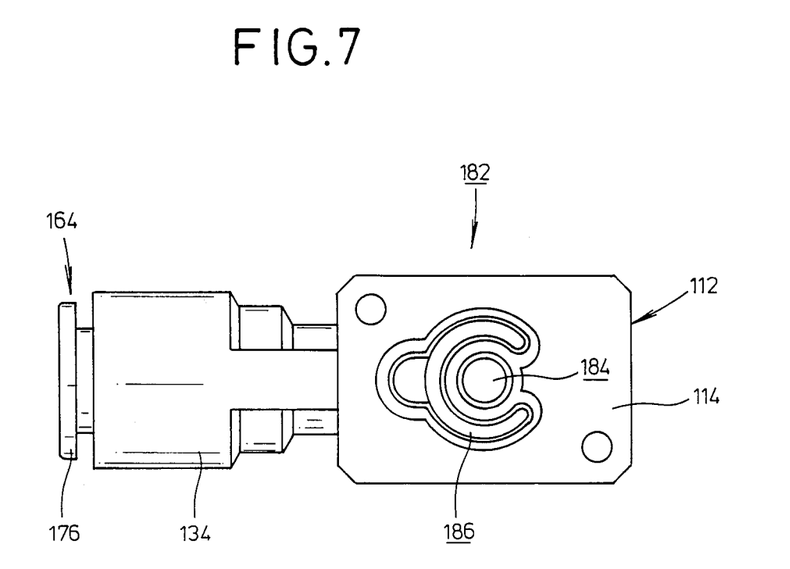
FIG. 7 is a bottom view of the tube joint shown in FIG. 6.

As shown in FIGS. 6 and 7, the tube joint 182 has a first cylindrical passage 184 extending axially through the attachment 114 and the column member 116, and a second partly ring-shaped passage 186 extending around the first passage 184 and having one end cut out. The first passage 184 extending axially through the column member 116 communicates with a chamber 188 defined between the end of the column member 116 and the surfaces defining the hole 136 in the first cylindrical body 132. The chamber 188 communicates with a passage 152 in the seal member 146 through the passage 142 in the second cylindrical body 134. The second passage 186 communicates through a hole 192 with a peripheral groove 194 defined in the outer periphery of the column member 116. The peripheral groove 194 is held in communication with the outer passage 179a of the double-walled tube 58 through the passage 144 of the second cylindrical body 134.

A coupling 198 is employed for mounting the tube joint 182 on the speed controller 54a as shown in FIG. 3. The coupling 198 has first and second openings 199a, 199b communicating with the respective holes 86a, 86b of the speed controller 54a. The first opening 199a communicates with the second passage 186 of the base member 110, whereas the second opening 199b communicates with the first passage 184 of the base member 110. Openings corresponding to the first and second openings 199a, 199b may be defined directly in the base member 110 of the tube joint 182, and the coupling 198 may be dispensed with.

When the double-walled tube 58 is connected to the double-walled tube connector mechanism 164, the inner passage 179a of the double-walled tube 58 communicates with the passage 142 through the passage 152 of the seal member 146 and with the first passage 184 through the chamber 188 communicating with the passage 142. The outer passage 179a of the double-walled tube 58 communicates with the second passage 186 through the passage 144 of the second cylindrical body 134, the peripheral groove 194, and the hole 192.

Irrespective of how the body member 112 may be angularly positioned with respect to the base member 110, the inner passage 179b of the double-walled tube 58 remains in communication with the first passage 184 through the chamber 188, and the outer passage 179a remains in communication with the second passage 186 through the peripheral groove 194. Accordingly, with the base member 110 fixed to the speed controller 54a, the body member 112 can freely be turned around the base member 110, so that the double-walled tube 58 connected to the body member 112 is prevented from being involved with other tubes. The base member 110 of the tube joint 182 may be about 180° reversed with respect to the speed controller 54a.

Figure 8:
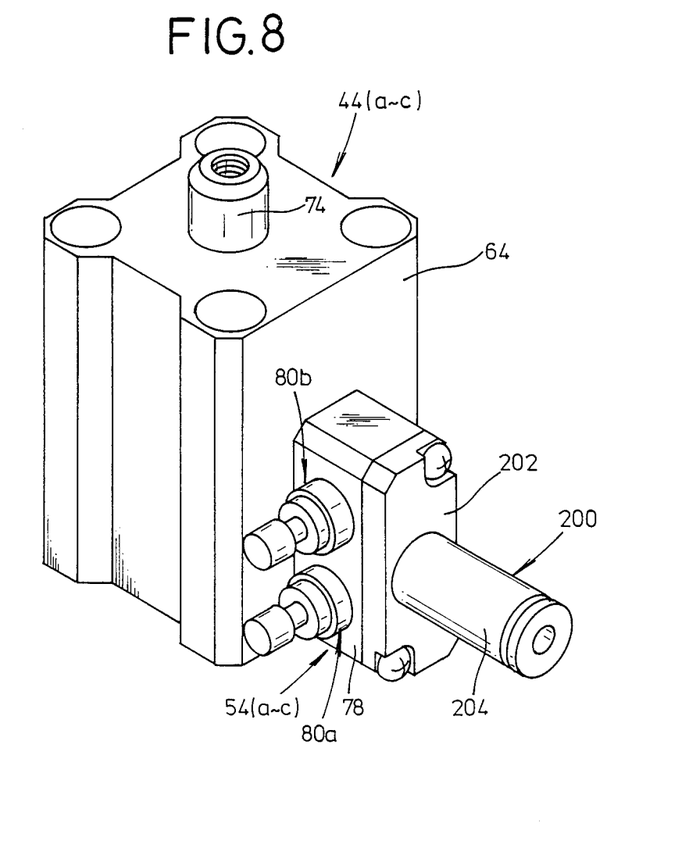
FIG. 8 is a perspective view of a portion of an actuator driving system according to still another embodiment of the present invention.
Figure 9:
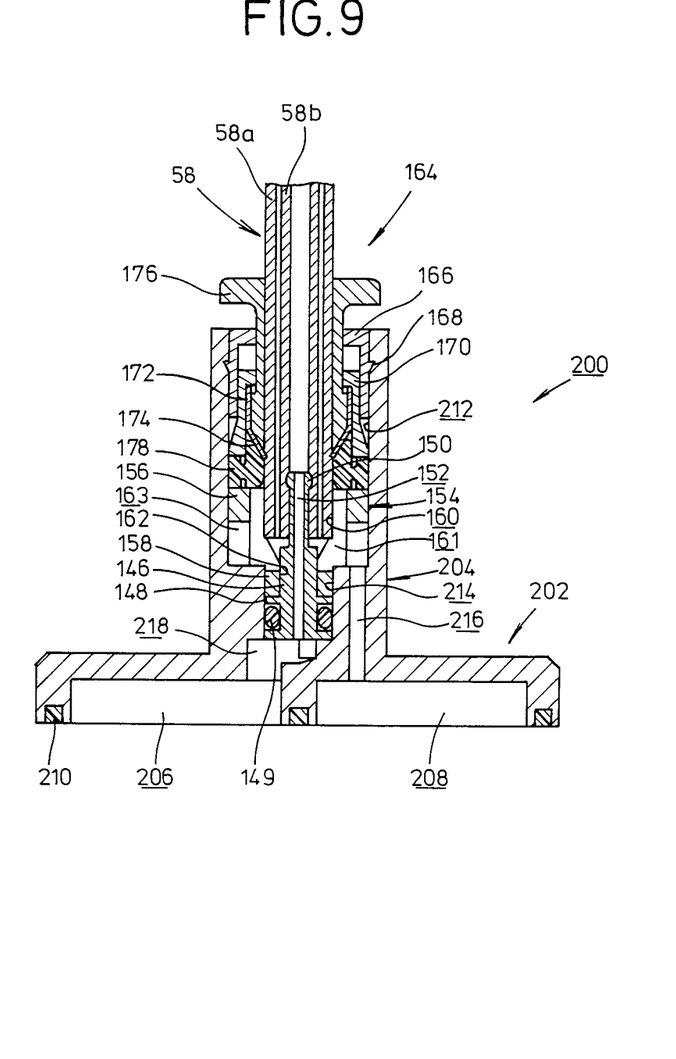
FIG. 9 is a cross-sectional view of a tube joint for use with a double-walled tube, which is incorporated in the actuator driving system of FIG. 8.

A tube joint according to a third embodiment of the present invention will be described with reference to FIGS. 8 and 9. Those components which are identical to those of the tube joint 56a of the first embodiment are designated by identical reference numerals and will not be described in detail.

A tube joint 200 comprises an attachment 202 to be attached to any of the speed controllers 54a through 54c, and a cylindrical body 204 extending upwardly from a substantially central portion of the attachment 202. The attachment 202 has first and second openings 206, 208 defined in its lower surface. A gasket 210 is received in the lower surface of the attachment 202 in surrounding relation to the first and second openings 206, 208 to hermetically seal them when the attachment 202 is mounted on the speed controller.

The cylindrical body 204 has defined therein a first hole 212 of a relatively large diameter and a second hole 214 of a relatively small diameter which communicates with the first hole 212. The first hole 212 communicates with the second opening 208 through a passage 216 defined parallel to the second hole 214, and the second hole 214 communicates with the first opening 206 through a bent passage 218.

The tube joint 200 thus constructed is also effective in connecting tubes easily substantially in the same manner as the tube joints according to the first embodiment.

In the first through third embodiments, the tube joints 56a through 56c, 182, and 200 are mounted on the air cylinders 44a through 44c through the speed controllers 54a through 54c. However, the speed controllers 54a through 54c may be dispensed with, and the tube joints 56a through 56c, 182, and 200 may directly be mounted on the air cylinders 44a through 44c. In such a case, the openings 118a, 118b, 199a, 199b, and 206, 208 of the tube joints 56a through 56c, 182, and 200 communicate directly with the passages 76a, 76b of the air cylinders 44a through 44c. The tube joints 56a through 56c, 182, and 200 may be about 180° reversed to change tubes for communication with the passages 76a, 76b of the air cylinders 44a through 44c.

With the arrangement of the present invention, as described above, the speed controllers and the tube joints for use with the double-walled tubes are fixed together to the fluid-pressure-operated actuators, and the double-walled tubes are employed for supplying a fluid to the actuators. Therefore, the number of tubes for supplying the fluid to the actuators is reduced, and the tubes can easily be connected without error.

Since the speed controllers and the tube joints are 180° reversible with respect to the actuators, the actuator driving system can easily accommodate design changes and hence are highly versatile in applications.

The body member of each tube joint is freely angularly movable with respect to the base member which has passages corresponding to the ports of the actuator such as a cylinder and which is fixed to the actuator. With the body member being angularly positioned as desired, the tube connected to the body member can easily be placed without being involved with other tubes when various actuators are installed. Therefore, the various actuators can be juxtaposed in closely spaced relation. As a result, the space that is taken up by these actuators can be reduced. It is also possible to place the tubes effectively by angularly moving the body members, without being adversely affected by the positions of existing actuators.

Although certain preferred embodiments have been shown and described, it should be understood that many changes and modifications may be made therein without departing from the scope of the appended claims.

What is claimed is:

1. An actuator driving system for driving a plurality of actuators operable by a fluid under pressure, comprising: a plurality of tube joints connected respectively to the actuators for being coupled with a plurality of double-walled tubes each having a plurality of passages; and a plurality of speed controllers connected between said actuators and said tube joints for controlling the speed of operation of said actuators, respectively, wherein said tube joints are selectively positionable with respect to said actuators, respectively, so as to permit said double-walled tubes to be connected to ports of said actuators in desired positions, said speed controllers being selectively positionable with respect to said actuators.

2. An actuator driving system according to claim 1, further including manifolds connected to a fluid source for supplying the fluid under pressure to said actuators, respectively, at least one directional control valve mounted on said manifold, and said double-walled tubes for introducing the fluid from said manifold into said actuators 3. A actuator driving system for driving a plurality of actuators operable by a fluid under pressure, comprising: a plurality of tube joints connected respectively to the actuators for being coupled with a plurality of double-walled tubes each having a plurality of passages, each of said tube joints including a base member having passages communicating with respective fluid ports of one of said actuators and mounted on said one actuator, and a body member having a first cylindrical body mounted on said base member and a second cylindrical body having an opening for insertion of one of said plurality of double-walled tubes therein to permit the passages of said one double-walled tube to communicate respectively with said passage of said base member, said first cylindrical body being angularly moveable with respect to said base member wherein said first and second cylindrical bodies of said body member are integral with and extend perpendicularly to each other.

4. An actuator driving system according to claim 3, wherein said base member has a column member fitted in said first cylindrical body, at least one of said passages of said base member being held in communication with a passage in said second cylindrical body through a peripheral groove defined in an outer peripheral surface of said column members.

5. An actuator driving system according to claim 3, further including a plurality of speed controllers connected between said actuators and said tube joints for controlling the speed of operation of said actuators, respectively.

6. An actuator driving system according to claim 5, wherein said speed controllers are selectively positionable with respect to said actuators.

7. An actuator driving system according to claim 3, further including manifolds connected to a fluid source for supplying the fluid under pressure to said actuators, respectively, at least one directional control valve mounted on said manifold, and said double-walled tubes for introducing the fluid from said manifold into said actuators.

* * * * *